United States Patent
Khan et al.

(10) Patent No.: US 11,653,334 B2
(45) Date of Patent: May 16, 2023

(54) SYSTEMS AND METHODS FOR REDUCING TRANSCODING RESOURCE ALLOCATION DURING CALL SETUP TO MULTIPLE TERMINATIONS

(71) Applicant: Verizon Patent and Licensing Inc., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Grapevine, TX (US); Gaurav Patel, McKinney, TX (US); Shawn Pugh, Easton, PA (US); Shujaat Ali Siddique, Hillsborough, NJ (US); Daniel L. Walker, Wall Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 17/102,755

(22) Filed: Nov. 24, 2020

(65) Prior Publication Data
US 2022/0167318 A1 May 26, 2022

(51) Int. Cl.
*H04W 72/04* (2023.01)
*H04M 3/56* (2006.01)
*G10L 19/16* (2013.01)

(52) U.S. Cl.
CPC ........... *H04W 72/04* (2013.01); *G10L 19/173* (2013.01); *H04M 3/56* (2013.01)

(58) Field of Classification Search
CPC ............. H04L 65/1069; H04L 12/1822; H04L 65/403; H04L 65/4061; H04M 7/0072; H04M 3/56; H04W 88/181; H04W 4/06; H04W 4/10; H04W 4/18; H04W 72/04; G10L 19/173
See application file for complete search history.

(56) References Cited

U.S. PATENT DOCUMENTS

| | | | | |
|---|---|---|---|---|
| 2006/0221871 A1* | 10/2006 | Emmons | ............... | H04L 65/403 370/261 |
| 2009/0143029 A1* | 6/2009 | Matsumoto | ............. | H04W 4/10 370/277 |
| 2013/0016631 A1* | 1/2013 | Delorme | ................. | H04L 63/12 370/259 |

(Continued)

*Primary Examiner* — Awet Haile

(57) ABSTRACT

In some implementations, an application server may receive, from a calling party user equipment, a call for a called party associated with multiple user equipment. The application server may provide to the multiple user equipment, and based on the call, a request for transcoding information associated with the multiple user equipment. The application server may assign a transcoding resource for handling the call, wherein the transcoding resource is provided in a network. The application server may receive, based on the request, the transcoding information from a particular user equipment of the multiple user equipment. The application server may provide the transcoding information to the transcoding resource, wherein the transcoding information causes the transcoding resource to establish and transcode the call between the calling party user equipment and the particular user equipment.

20 Claims, 9 Drawing Sheets

(56) References Cited

U.S. PATENT DOCUMENTS

| | | | | |
|---|---|---|---|---|
| 2014/0211619 A1* | 7/2014 | Suryavanshi | ....... | H04L 47/2425 |
| | | | | 370/230 |
| 2014/0321417 A1* | 10/2014 | Yang | ................... | H04L 65/1069 |
| | | | | 370/352 |
| 2016/0021163 A1* | 1/2016 | Lee | ......................... | H04W 4/18 |
| | | | | 370/352 |

* cited by examiner

SYSTEMS AND METHODS FOR REDUCING TRANSCODING RESOURCE ALLOCATION DURING CALL SETUP TO MULTIPLE TERMINATIONS

BACKGROUND

An internet protocol (IP) multimedia subsystem (IMS) provides a platform for delivering IP multimedia services. An IMS network may utilize a session initiation protocol (SIP) to enable access to multimedia applications and/or voice applications via wired communications and/or wireless communications. A wireless communication system, such as a 5G communication system, may be communicatively coupled with an IMS network to enable communication between a user equipment (UE) and the IMS network.

DETAILED DESCRIPTION OF PREFERRED EMBODIMENTS

Figure 1A:
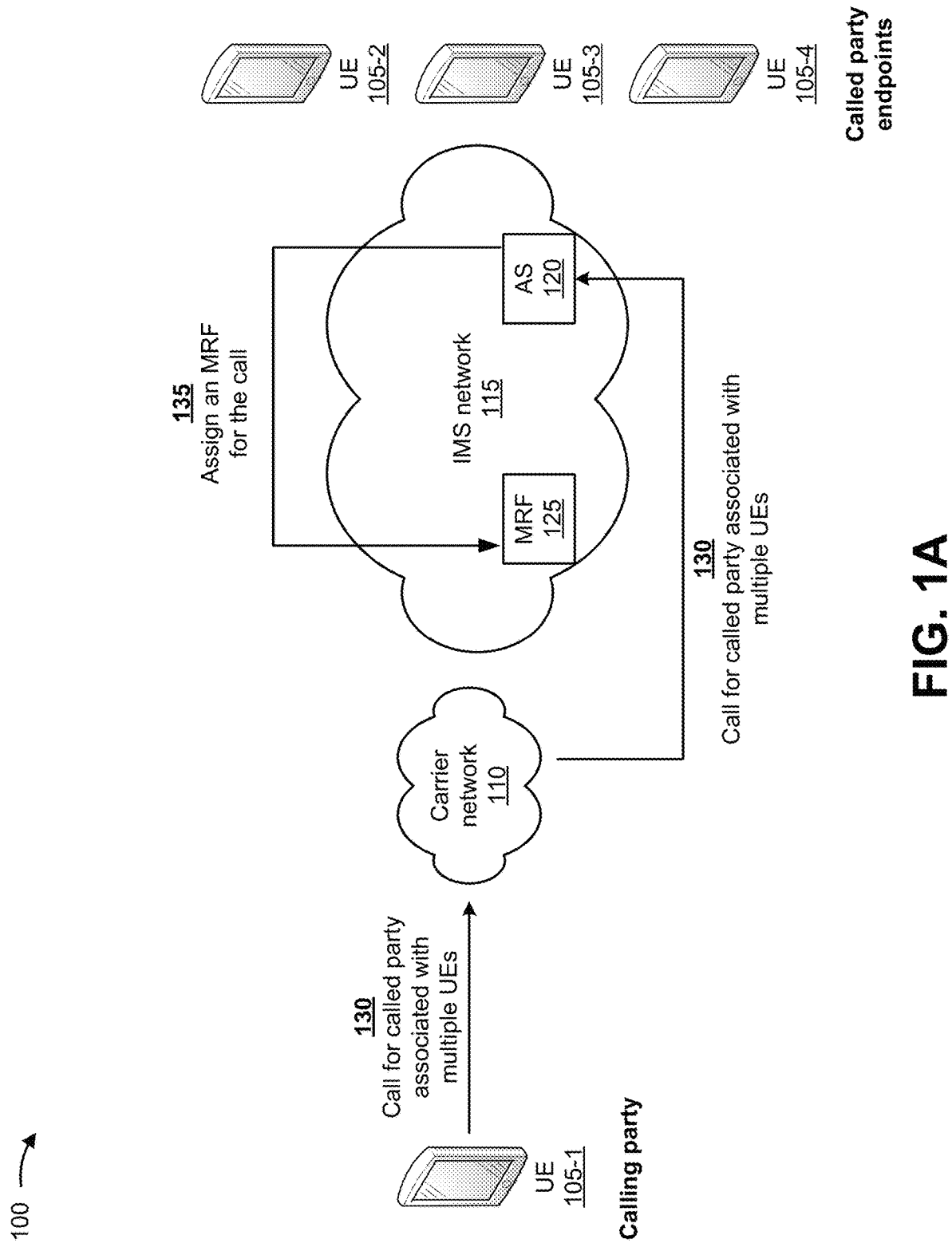
FIGS. 1A-1E are diagrams of one or more example implementations 100 associated with reducing transcoding resource allocation during call setup to multiple terminations.

The following detailed description of example implementations refers to the accompanying drawings. The same reference numbers in different drawings may identify the same or similar elements.

A calling party may initiate a call to a called party over an Internet protocol (IP) multimedia subsystem (IMS) network. The call may be initiated using an originating user equipment (UE) and the called party may be associated with a plurality of terminating UEs. In some instances, each terminating UE (of the plurality of terminating UEs) may be assigned to a different application server. In this case, each application server may identify and allocate a different transcoding resource (such as a media resource function) to perform transcoding operations (e.g., when the call is established between the originating UE and the terminating UE assigned to the application server).

Alternatively, the plurality of terminating UEs may be assigned to a single application server. In this case, the application server may identify and allocate a different transcoding resource (for each corresponding terminating UE) to perform the transcoding operations (e.g., when the call is established between the originating UE and the corresponding terminating UE). In either case, a plurality of transcoding resources (each associated with a different one of the plurality of terminating UE) may be allocated prior to the call being established. In this regard, the plurality of terminating UE may cause the plurality of transcoding resources to be allocated.

Once the call is established between the originating UE and a particular terminating UE (of the plurality of terminating UEs), one transcoding resource (of the plurality of transcoding resources) associated with the particular terminating UE is used to perform the transcoding operations during the call. Remaining transcoding resources (of the plurality of transcoding resources that have been allocated for the call) will be unused as the remaining transcoding resources will be unnecessary for the established call.

Accordingly, the process for establishing a call between a calling party and a called party associated with a plurality of terminating UE requires the allocation of multiple transcoding resources (e.g., one transcoding resource for each terminating UE). While multiple transcoding resources are allocated for the call, only one transcoding resource is used during the call. Therefore, such a process wastes network resources, computing resources, and/or other resources associated with the call.

Some implementations described herein prevent or reduce the allocation of unnecessary transcoding resources during a process of establishing a call between a calling party and a called party associated with multiple UEs. For example, an application server (of a network) may receive, from a calling party UE, a call for a called party associated with multiple UEs. The application server may provide, to the multiple UEs and based on the call, a request for transcoding information associated with the multiple UEs. The application server may assign a transcoding resource for handling the call. The application server may receive, based on the request, the transcoding information from a particular UE (of the multiple UEs) and may provide the transcoding information to the transcoding resource to transcode the call between the calling party UE and the particular UE.

In other words, some implementations described herein may enable a single transcoding resource to be allocated regardless of the quantity of UEs associated with the called party, thereby reducing the amount of transcoding resources (e.g., within an IMS network) allocated for the call. Accordingly, some implementations described herein may preserve network resources, computing resources, and/or other resources that would have otherwise been used to allocate multiple transcoding resources during the process of establishing a call between a calling party and a called party associated with multiple UEs.

FIGS. 1A-1E are diagrams of one or more example implementations 100 associated with reducing transcoding resource allocation during call setup to multiple terminations. As shown in FIGS. 1A-1E, example implementation(s) 100 may include a plurality of user equipment (UEs) 105 (collectively "UEs 105" and individually "UE 105"), a carrier network 110, an Internet protocol (IP) multimedia subsystem (IMS) network 115, an application server (AS) 120, and a media resource function (MRF) 125.

UE 105 may include a communication and/or computing device, such as a mobile phone, a smartphone, a laptop computer, a desktop computer, a tablet computer, an Internet of Things device, and/or another type of communication and/or computing device. UE 105-1 may be a UE of a calling party and may be associated with a carrier network 110. UE 105-2, UE 105-3, and UE 105-4 may be UEs of a called party. In some examples, UE 105-2, UE 105-3, and UE 105-4 may be different types of UEs 105. In some examples, UE 105-2, UE 105-3, and UE 105-4 may be associated with a same carrier network 110 as UE 105-1. In some examples, UE 105-2, UE 105-3, and UE 105-4 may be associated with a different carrier network 110 than associated with UE 105-1.

Carrier network 115 may include various types of telecommunications networks, such as a 4G network, a 5G network, a 5G next generation core network (NG Core), a long-term evolution (LTE) network, an LTE evolved packet core (EPC), and/or another type of telecommunication network. IMS network 115 may provide IMS services and may include AS 120 and MRF 125. AS 120 may include one or more devices that enable calls to be established between calling parties and called parties over IMS network 115. In this regard, AS 120 may provide data to and/or receive data from UEs of the calling parties and UEs of the called parties (e.g., via IMS network 115).

In some examples, AS 120 may be assigned to UE 105-2, UE 105-3, and UE 105-4 when UE 105-2, UE 105-3, and UE 105-4 registered with IMS network 115. Additionally, or alternatively, AS 120 may be assigned to UE 105-1 when UE 105-1 registered with IMS network 115. MRF 125 may include one or more devices that perform transcoding operations during the calls between the calling parties and the called parties. In some examples, MRF 125 may be allocated by AS 120 to perform transcoding operations during one or more of the calls between the calling parties and the called parties.

As shown in FIG. 1A, and by reference number 130, AS 120 may receive a call for the called party associated with multiple UEs 105 (e.g., UE 105-2, UE 105-3, and UE 105-4). For example, the calling party may cause UE 105-1 to initiate the call using an identifier of the called party (e.g., a telephone number associated with the called party). The identifier of the called party may be associated with the multiple UEs 105 such that calls initiated using the identifier of the called party may be routed to any one of the multiple UEs 105.

In some examples, the called party may be an entity, the call may be a service call to the entity, and the multiple UEs 105 may be associated with call assistants (e.g., human assistants and/or virtual assistants) that handle service calls on behalf of the entity. For instance, the identifier may be a service number (e.g., a 1-800 number). Alternatively, the called party may be an individual, the call may be a call to the individual, and the multiple UEs 105 may be associated with the individual.

In some implementations, UE 105-1 may initiate the call to cause the call to be established via a session initiation protocol (SIP). In this regard, when receiving the call, AS 120 may receive a SIP INVITE message that includes call information associated with establishing the call between UE 105-1 and one of the multiple UEs (e.g., UE 105-2, 105-3, or UE 105-4) and includes transcoding information associated with UE 105-1.

The call information may include information identifying the calling party and information identifying the called party. The information identifying the calling party may include an IP address associated with the calling party (e.g., an IP address associated with UE 105-1), a port identifier associated with the calling party (e.g., a port name and/or a port number associated with UE 105-1), and/or other information identifying the calling party.

The information identifying the called party may include an IP address associated with the called party, a port identifier (e.g., a port name and/or a port number) associated with the called party, and/or other information identifying the called party. The information identifying the called party may include the identifier of the called party. In some examples, the information identifying the called party may be associated the multiple UEs 105 and, accordingly, any call initiated using the information identifying the called party may be routed to the multiple UEs 105.

AS 120 may use the information identifying the calling party to transmit messages (or requests) to UE 105-1 and may use the information identifying the called party to transmit messages (or requests) to the multiple UEs 105. The call may be initiated by UE 105-1 while UE 105-1 is connected to carrier network 110 and AS 120 may receive the call from carrier network 110. In some examples, carrier network 110 may route the call to AS 120 based on the information identifying the called party being associated with the multiple UEs 105 and based on AS 120 being assigned to the multiple UEs 105. Additionally, or alternatively, carrier network 110 may route the call to AS 120 based on AS 120 being assigned to UE 105-1.

The transcoding information may be used during the call. For example, the transcoding information may be used to transcode and/or convert data, transmitted by UE 105-1 during the call, to data associated with the multiple UEs 105. In some implementations, the transcoding information may include a codec associated with UE 105-1.

As shown in FIG. 1A, and by reference number 135, AS 120 may assign an MRF for the call. For example, based on receiving the call, AS 120 may allocate a transcoding resource (e.g., MRF 125) to perform transcoding operations to address issues related to any possible disparity between the transcoding information (e.g., codec) associated with UE 105-1 and transcoding information (e.g., codec) associated with the multiple UEs 105. For instance, AS 120 may allocate MRF 125 to cause MRF 125 to use the transcoding information (associated with UE 105-1) to transcode and/or convert data, transmitted by UE 105-1 during the call, to data associated with the multiple UEs 105, and vice versa.

In some implementations, AS 120 may obtain information identifying MRF 125 from a data structure (e.g., stored in a memory associated with AS 120) that stores information identifying a plurality of MRFs. The information identifying the plurality of MRFs may be stored in associated with information identifying corresponding application servers, information identifying supported transcoding information, information identifying corresponding UEs, information identifying availability of the plurality of MRFs, IP addresses associated with the plurality of MRFs, port identifiers associated with the plurality of MRFs (e.g., port names and/or port numbers associated with the plurality of MRFs), and/or other information regarding the plurality of MRFs.

In some implementations, MRF 125 may correspond to an MRF that is assigned (to AS 120) to perform transcoding operations during calls established via AS 120. In this regard, AS 120 may obtain (from the data structure) the information identifying MRF 125 based on information identifying AS 120. Additionally, or alternatively, MRF 125 may correspond to an MRF that is capable of performing transcoding operations using the transcoding information associated with UE 105-1. In this regard, AS 120 may obtain (from the data structure) the information identifying MRF 125 based on the transcoding information associated with UE 105-1.

Additionally, or alternatively, MRF 125 may correspond to an MRF assigned to the multiple UEs 105. In this regard, AS 120 may obtain (from the data structure) the information identifying MRF 125 based on information identifying the multiple UEs 105 (e.g., the information identifying the called party). Additionally, or alternatively, MRF 125 may correspond to one of multiple MRFs assigned to the multiple UEs 105. In this regard, AS 120 may obtain (from the data structure) the information identifying MRF 125 based on the information identifying the multiple UEs 105 and based on availability of the multiple MRFs.

The information identifying MRF 125 may include an IP address associated with MRF 125, a port identifier associated with MRF 125 (e.g., a port name and/or a port number associated with MRF 125), and/or other information identifying MRF 125. In some implementations, in order to allocate MRF 125, AS 120 may transmit a request to MRF 125 to allocate MRF 125. The request may include the transcoding information associated with UE 105-1 (e.g., information identifying the codec associated with UE 105-1), information indicating that transcoding information associated with the multiple UEs 105 is unknown, and/or information indicating that MRF 125 is to be allocated to perform transcoding operations during the call between UE 105-1 and one the multiple UEs 105. In some implementations, when transmitting the request, AS 120 may transmit a SIP INVITE message.

AS 120 may receive, from MRF 125, a response to the request transmitted to MRF 125. The response may indicate that MRF 125 may be allocated to perform the transcoding operations during the call (e.g., using the transcoding information associated with UE 105-1). For example, AS 120 may receive a SIP message responsive to the SIP INVITE message transmitted to MRF 125. The SIP message may include a SIP 200 OK message that includes the transcoding information associated with UE 105-1 (which indicates that MRF 125 is capable of using the transcoding information associated with UE 105-1) and information identifying transcoding information supported by MRF 125. For example, the SIP 200 OK message may include information identifying one or more codecs that MRF 125 is capable of using to perform transcoding operations (e.g., on data transmitted by one of the multiple to UE 105-1 during the call.

In some implementations, AS 120 may allocate MRF 125 for the call based on receiving the SIP message responsive to the SIP INVITE message transmitted to MRF 125. AS 120 may transmit a message to MRF 125 based on receiving the response from MRF 125. The message may indicate that AS 120 has received the response from MRF 125. For example, AS 120 may transmit a SIP ACK message to MRF 125.

Figure 1B:
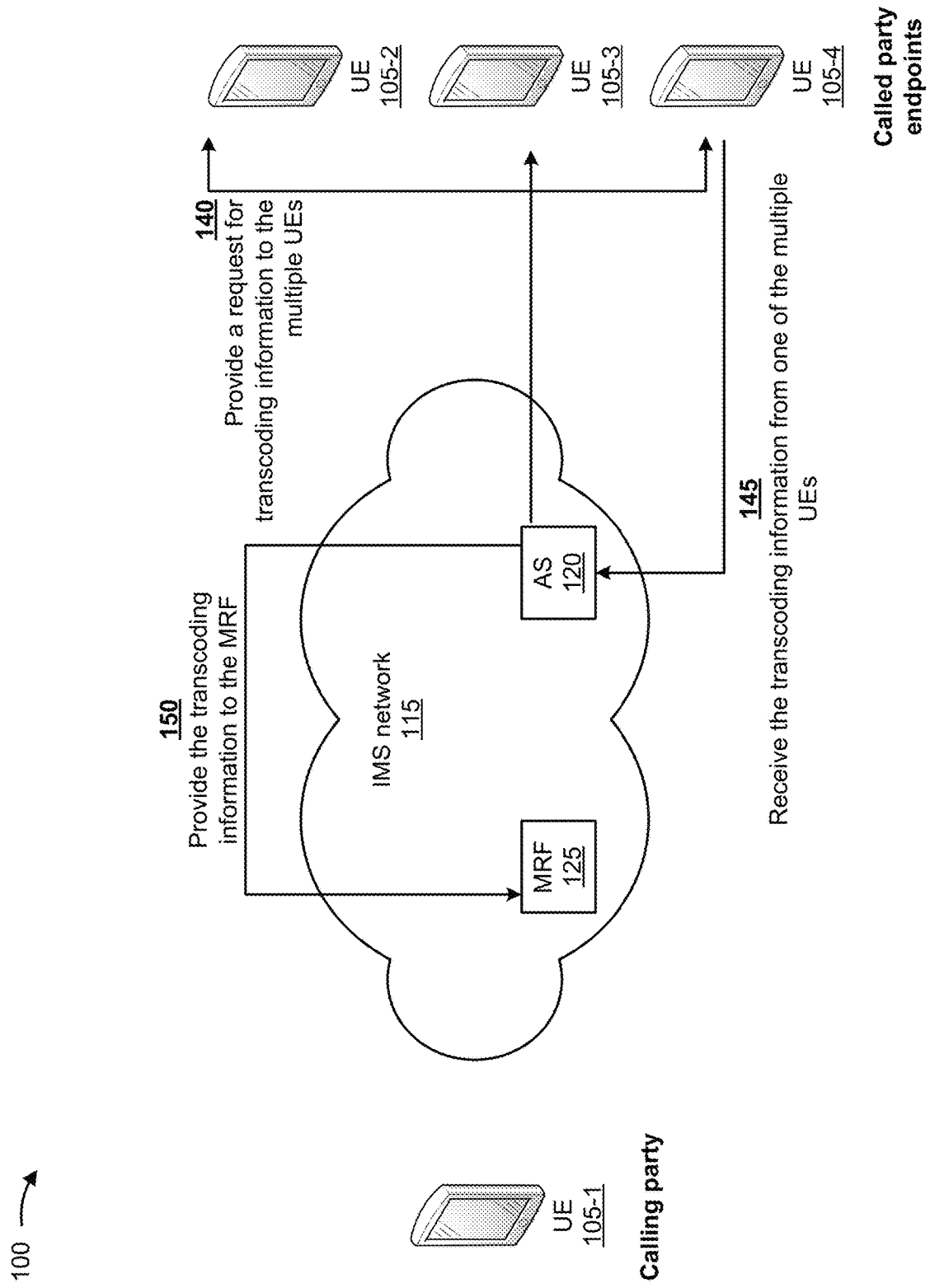

As shown in FIG. 1B, and by reference number 140, AS 120 may provide a request for transcoding information to the multiple UEs 105. For example, based on receiving the call and/or based on receiving the response from MRF 125, AS 120 may transmit, to the multiple UEs 105, the request for the transcoding information (e.g., one or more codecs) associated with the multiple UEs 105. As an example, the transcoding information (associated with UE 105-2) may be used to transcode and/or convert data, transmitted by UE 105-2 during the call (if established with UE 105-2), to data associated with UE 105-1. The transcoding information (associated with UE 105-2) may include a codec associated with UE 105-2.

AS 120 may identify the multiple UEs 105 and transmit the request to the multiple UEs 105 identified by AS 120. In some implementations, AS 120 may identify the multiple UEs 105 based on the information identifying the called party included in the call information.

For example, AS 120 may search one or more data structures (e.g., stored in a memory associated with AS 120) using the information identifying the called party. The one or more data structures may store information identifying one or more called parties in association with information identifying UEs associated with the one or more called parties. As an example, the information identifying a UE, stored in the one or more data structures, may include an IP address associated with the UE, a port identifier associated with the UE (e.g., a port name and/or a port number associated with the UE), and/or other information identifying the UE.

AS 120 may provide the request (for the transcoding information associated with the multiple UEs 105) to the multiple UEs 105 using the information identifying the multiple UEs 105. For example, AS 120 may transmit the request to the IP addresses associated with the multiple UEs 105 and/or the port identifiers associated with the multiple UEs. Additionally, or alternatively, AS 120 may transmit the request using the IP address associated with the called party and/or the port identifier associated with the called party.

In some implementations, the request (for the transcoding information associated with the multiple UEs 105) may include a SIP INVITE message requesting the transcoding information associated with the multiple UEs 105. For example, AS 120 may transmit (to UE 105-2) a SIP INVITE message requesting the transcoding information associated with UE 105-2, transmit (to UE 105-3) a SIP INVITE message requesting the transcoding information associated with UE 105-3, and so on. In some implementations, the SIP INVITE message may include information identifying the transcoding information obtained from MRF 125 (e.g., information identifying the one or more codecs supported by MRF 125).

In some implementations, based on receiving the response from MRF 125, AS 120 may prevent additional transcoding resources from being allocating for the call, as described in detail below. For example, AS 120 may prevent one or more other application servers (e.g., associated with the multiple UEs 105) from assigning additional transcoding resources for handling the call. In some implementations, the one or more data structures may include information identifying application servers in association with the information identifying the multiple UEs. Accordingly, AS 120 may obtain, from the one or more data structures, the information identifying the one or more application servers using the information identifying the multiple UEs.

As an example, the information identifying the one or more application servers may include one or more IP addresses associated with the one or more application servers, one or more port identifiers associated with the one or more application servers, and/or other information identifying the one or more application servers. AS 120 may transmit, using the information identifying the one or more application servers, a message indicating that MRF 125 has been allocated for the call and indicating that no additional transcoding resource is to be allocated. By preventing additional transcoding resources from being allocated for the call, AS 120 may preserve network resources, computing resources, and/or other resources that would have otherwise been used by the additional transcoding resources to handle the call.

As shown in FIG. 1B, and by reference number 145, AS 120 may receive the transcoding information from one of the multiple UEs 105. For example, AS 120 may receive the transcoding information from one of the multiple UEs 105 as a response to the request transmitted to the multiple UEs 105. As shown in FIG. 1B, AS 120 may receive the transcoding information from UE 105-4. In this regard, UE 105-4 may correspond to a first UE 105 (out of the multiple UEs 105) to respond to the request by AS 120 to the multiple UEs 105.

In some implementations, the transcoding information (received from UE 105-4) may include a codec associated with UE 105-4. In some instances, the transcoding information received from UE 105-4 may be included in the transcoding information obtained from MRF 125. For example, the codec associated with UE 105-4 may be included in the one or more codecs supported by MRF 125.

In some implementations, the response (received from UE 105-4) may include a SIP message responsive to the SIP INVITE message transmitted to the multiple UEs 105. The SIP message may include a SIP 200 OK message that includes the transcoding information associated with UE 105-4 (e.g., information identifying the codec associated with UE 105-4). AS 120 may transmit a message to UE 105-4 based on receiving the response from UE 105-4. The message may indicate that AS 120 has received the response from UE 105-4. For example, AS 120 may transmit a SIP ACK message to UE 105-4.

As shown in FIG. 1B, and by reference number 150, AS 120 may provide the transcoding information to MRF 125. For example, AS 120 may transmit, to MRF 125, the transcoding information associated with UE 105-1 (received from UE 105-1) and the transcoding information associated with UE 105-4 (received from UE 105-4).

In some implementations, when transmitting the transcoding information to MRF 125, AS 120 may transmit a SIP message to MRF 125. For example, AS 120 may transmit a second SIP INVITE message to MRF 125. In this instance, the second SIP INVITE message may include the transcoding information associated with UE 105-4 (e.g., the codec associated with UE 105-4) in addition to the transcoding information associated with UE 105-1 (e.g., the codec associated with UE 105-1).

AS 120 may receive, from MRF 125, a response to the transcoding information transmitted to MRF 125. For example, AS 120 may receive a SIP message responsive to the second SIP INVITE message transmitted to MRF 125. The SIP message may include a SIP 200 OK message that includes information identifying transcoding information (e.g., codecs) that MRF 125 will use to perform the transcoding operations during the call. For example, the SIP 200 OK message may include information identifying the codec that MRF 125 will use to transcode data transmitted by UE 105-1 (e.g., information identifying the codec associated with UE 105-1) and information identifying the codec that MRF 125 will use to transcode data transmitted by UE 105-4 (e.g., information identifying the codec associated with UE 105-4).

Figure 1C:
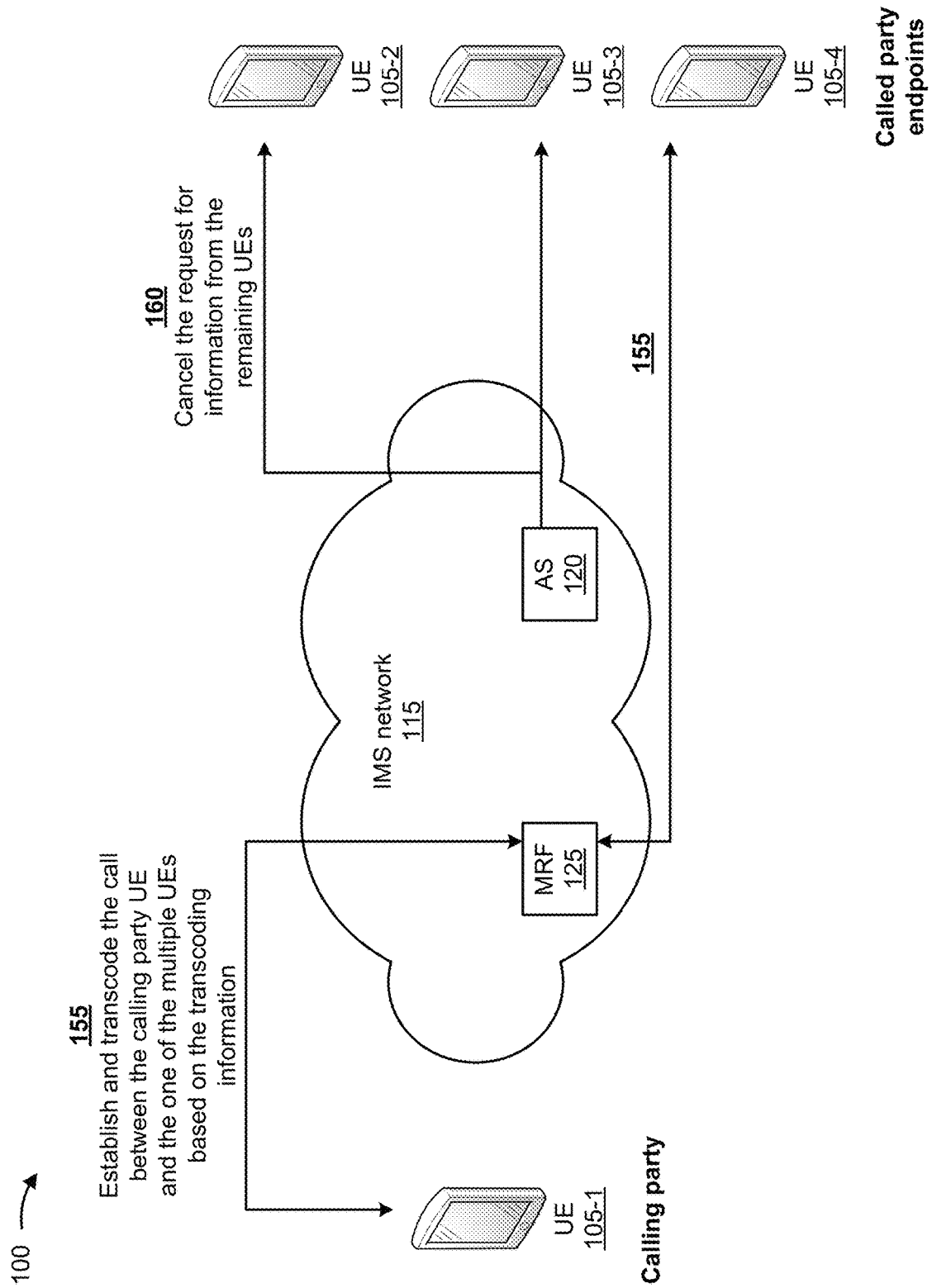

As shown in FIG. 1C, and by reference number 155, AS 120 may establish and transcode the call between the calling party UE and the one of the multiple UEs based on the transcoding information. For example, AS 120 may cause the call to be established between UE 105-1 and UE 105-4 and may cause MRF 125 to perform the transcoding operations during the call, as described above.

In some implementations, based on receiving the response to the transcoding information transmitted to MRF 125, AS 120 may transmit (to UE 105-1) the transcoding information that MRF 125 will use to transcode data transmitted by UE 105-1 during the call. The transcoding information may correspond to the transcoding information associated with UE 105-1 (previously transmitted by UE 105-1 to AS 120). In other words, AS 120 may transmit (to UE 105-1) information confirming that the transcoding information associated with UE 105-1 will be used by MRF 125, as explained above.

In some implementations, when transmitting the information to UE 105-1, AS 120 may transmit a SIP message. For example, AS 120 may transmit a SIP 200 OK message (to UE 105-1) indicating that the transcoding information associated with UE 105-1 will be used by MRF 125. AS 120 may receive a response (from UE 105-1) to the information transmitted to UE 105-1. For example, AS 120 may receive a SIP message indicating that UE 105-1 has received the information transmitted by AS 120. For example, AS 120 may receive a SIP ACK message from UE 105-1.

Based on receiving the response from UE 105-1, AS 120 may cause the call to be established between UE 105-1 and UE 105-4 (e.g., via SIP). In some implementations, AS 120 may cause MRF 125 to establish the call and transcode the call using the transcoding information associated with UE 105-1 and the transcoding information associated with UE 105-4, as explained above. AS 120 may cause a two-way audio call to be established between UE 105-1 and UE 105-4.

In some implementations, AS 120 may cause audio (and/or video and/or text transmission) for the call to be provide via a real time control protocol. In some instances, the transcoding information associated with UE 105-1 and/or the transcoding information associated with UE 105-1 may cause MRF 125 to provide audio (and/or video and/or text transmission) for the call via the real time control protocol.

In some implementations, AS 120 may receive, from UE 105-1, an indication of termination of the call between UE 105-1 and UE 105-4 following a period of time during which the call is established. For example, AS 120 may receive a SIP BYE message from UE 105-1. Based on receiving the indication of termination of the call, AS 120 may transmit the indication of the termination of the call to UE 105-4 in order to end the call between UE 105-1 and 105-4. For example, AS 120 may transmit the SIP BYE message to UE 105-4.

AS 120 may receive a response, from UE 105-4, indicating that UE 105-4 has received the indication of termination of the call. For example, AS 120 may receive a SIP 200 OK message indicating that UE 105-4 has received the indication of the termination of the call. In some implementations, AS 120 may transmit a message to UE 105-4 based on receiving the response from UE 105-4. The message may indicate that AS 120 has received the response from UE 105-4. For example, AS 120 may transmit a SIP ACK message to UE 105-4.

AS 120 may transmit a response, to UE 105-1, indicating that AS 120 has received the indication of the termination of the call. For example, AS 120 may transmit a SIP 200 OK message indicating that AS 120 has received the indication of the termination of the call. In some implementations, AS 120 may receive a message from UE 105-1 based on transmitting the response to UE 105-1. The message may indicate that UE 105-1 has received the response from AS 120. For example, AS 120 may receive a SIP ACK message from UE 105-1.

In some implementations, based on receiving the message indicating that UE 105-1 has received the response from AS 120, AS 120 may cause the call between UE 105-1 and UE 105-4 to be terminated. AS 120 may cause any resource allocated for the call (e.g., MRF 125) to be released. Alternatively, AS 120 may receive an indication of termination of the call from UE 105-4 and may cause the call to be terminated in a manner similar to the manner described above.

As shown in FIG. 1C, and by reference number 160, AS 120 may cancel the request for information from the remaining UEs. For example, based on receiving the transcoding information from UE 105-4, AS 120 may cancel the request for the transcoding information transmitted to UE 105-2 and UE 105-3. For example, AS 120 may transmit, to UE 105-2 and UE 105-3, a request to cancel the request for the transcoding information. AS 120 may receive, from UE 105-2 and from UE 105-3, a response indicating that UE 105-2 and UE 105-3 have canceled the request for the transcoding information.

In some implementations, AS 120 may transmit a SIP message, to UE 105-2 and UE 105-3, to cancel the request for the transcoding information. For example, AS 120 may transmit a SIP CANCEL message to UE 105-2 to cancel the request for the transcoding information and a SIP CANCEL message to 105-3 to cancel the request for the transcoding information. AS 120 may receive a SIP 200 OK message from UE 105-2 in response to the SIP CANCEL message transmitted to UE 105-2 and may receive a SIP 200 OK message from UE 105-3 in response to the SIP CANCEL message transmitted to UE 105-3.

By canceling the request for the transcoding information, AS 120 may preserve computing resources, network resources, and/or other types of resources that would have otherwise been used by UE 105-2 and UE 105-3 to transmit the transcoding information associated with UE 105-2 and the transcoding information associated with UE 105-3.

Figure 1D:
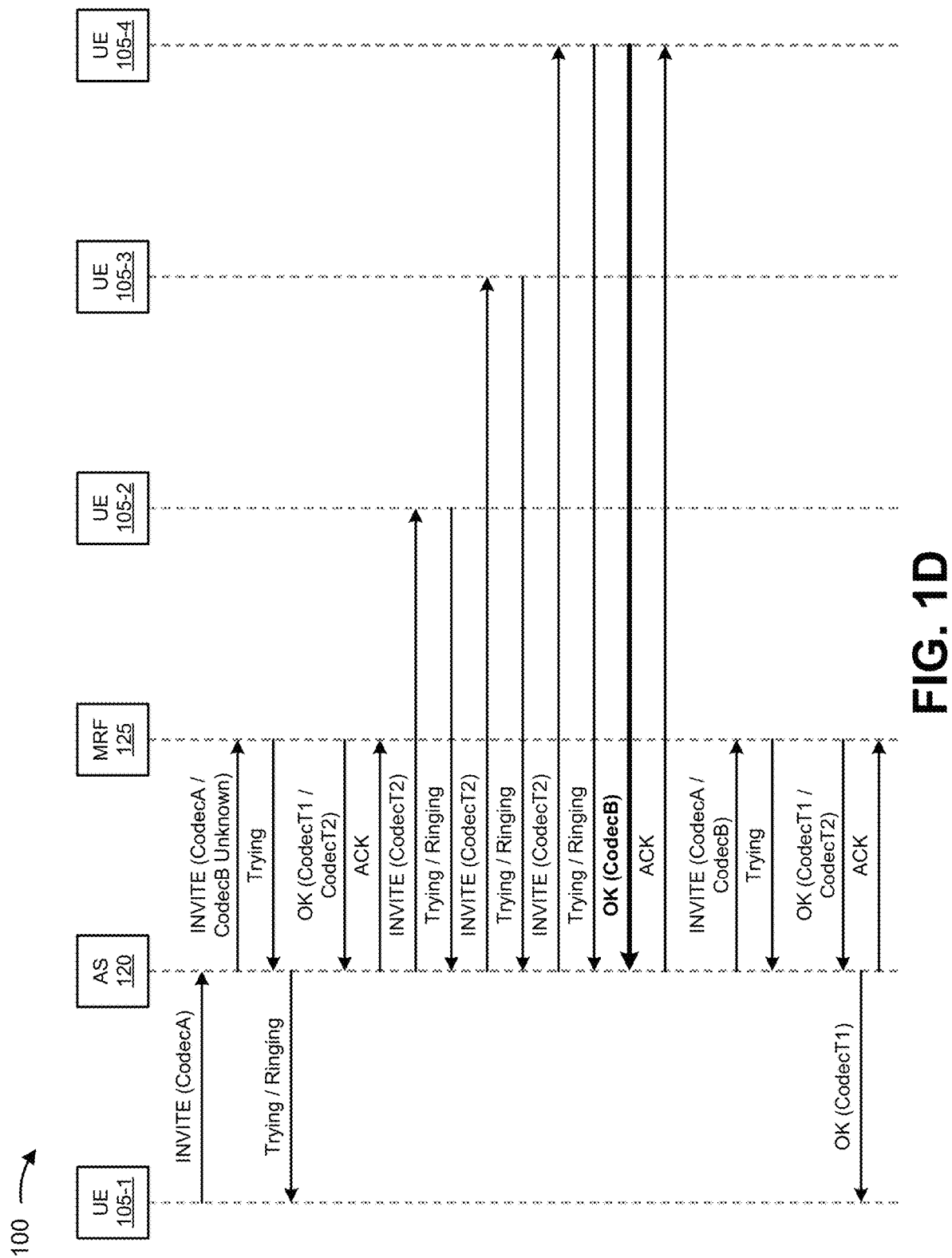
Figure 1E:
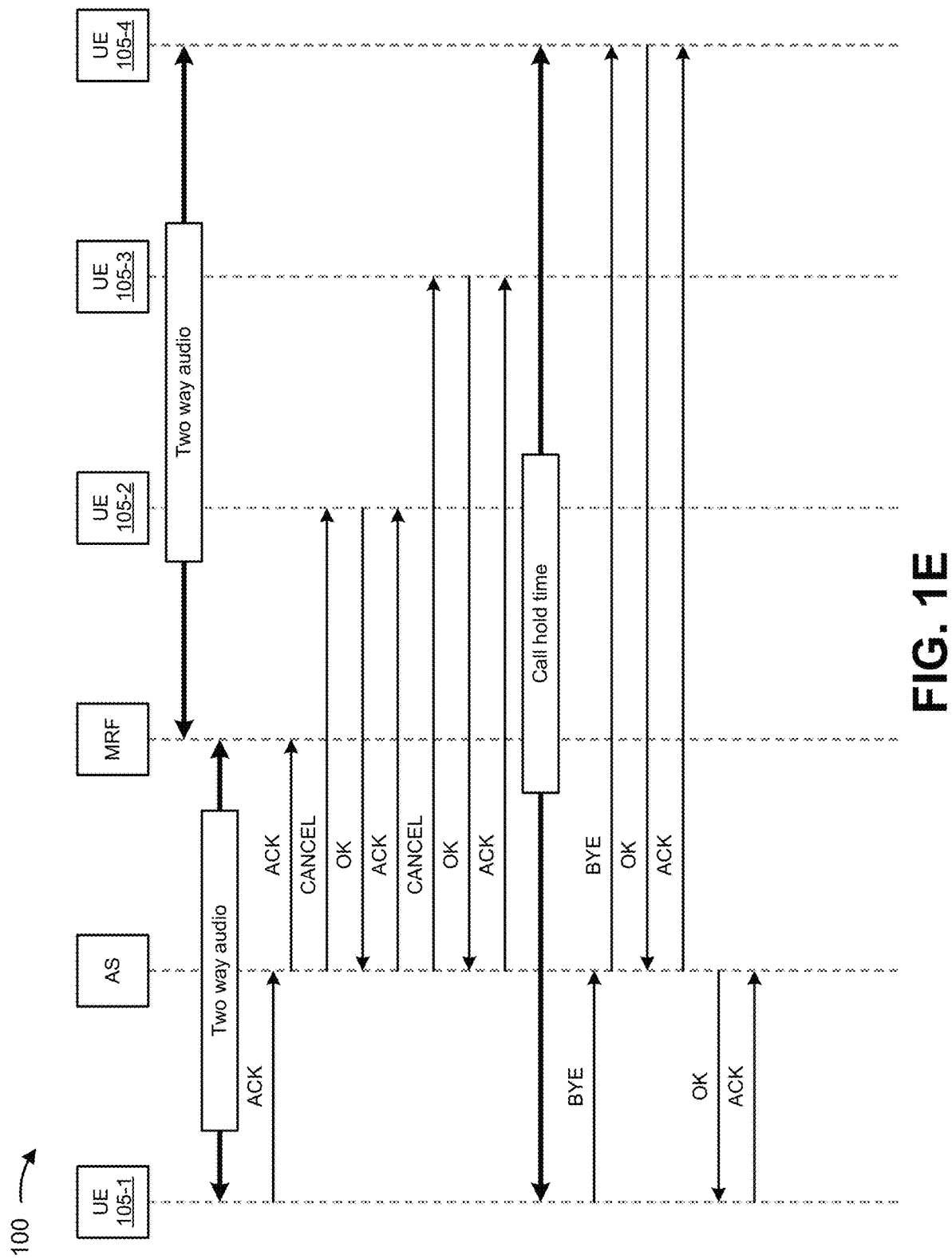

FIGS. 1D and 1E illustrate a call flow associated with the description provided above in connection with FIGS. 1A-1C. As showing in FIG. 1D, UE 105-1 may transmit a SIP INVITE message, to AS 120, including a request to establish a call between UE 105-1 and a UE associated with a called party (e.g., UE 105-2, UE 105-3, or UE 105-4). The SIP INVITE message may include information identifying a codec associated with UE 105-1 (e.g., CodecA).

Based on receiving the SIP INVITE from UE 105-1, AS 120 may transmit a SIP INVITE message to MRF 125. The SIP INVITE message may include a request to allocate MRF 125 to perform transcoding operations during the call. AS 120 may identify MRF 125 as explained above. The SIP INVITE message (transmitted to MRF 125) may include information identifying CodecA and information indicating that the codec associated with the UE (associated with the called party) is unknown.

As shown in FIG. 1D, MRF 125 may transmit, to AS 120, a SIP Trying message indicating that the request (from AS 120 to allocated MRF 125) is being processed by MRF 125. AS 120 may transmit a SIP Trying/Ringing message to UE 105-1 (e.g., based on receiving the SIP Trying message). The SIP Trying/Ringing message may indicate, to UE 105-1, that AS 120 is processing the request to establish the call and/or that the UE (of the called party) is ringing. After processing the request, MRF 125 may transmit a SIP 200 OK message indicating that MRF 125 may be allocated to perform the transcoding operations during the call (e.g., using the transcoding information associated with UE 105-1). The SIP 200 OK message may include information regarding CodecA (e.g., CodecT1) and include information identifying one or more codecs that are supported by MRF 125 (e.g., CodecT2). Based on receiving the SIP 200 OK message, AS 120 may transmit a SIP ACK message indicating that AS 120 has received the SIP 200 OK message.

Based on receiving the SIP 200 OK message, AS 120 may transmit (to UE 105-2) a SIP INVITE message to request information identifying a codec associated with UE 105-2, transmit (to UE 105-3) a SIP INVITE message to request information identifying a codec associated with UE 105-3, and transmit (to UE 105-4) a SIP INVITE message to request information identifying a codec associated with UE 105-4.

As shown in FIG. 1D, AS 120 may receive a SIP Trying/Ringing message from UE 105-2, receive a SIP Trying/Ringing message from UE 105-3, and receive a SIP Trying/Ringing message from UE 105-4. The SIP Trying/Ringing message (from a respective UE 105) may indicate, to AS 120, that the respective UE 105 is processing the request for the information identifying the codec associated with the respective UE 105 and/or that the respective UE 105 is ringing.

As shown in FIG. 1D, AS 120 may receive from a SIP 200 OK message, from UE 105-4, including a codec associated with UE 105-4 (e.g., CodecB). Based on receiving the SIP 200 OK message, AS 120 may transmit a SIP ACK message, to UE 105-4, indicating that AS 120 has received the SIP 200 OK message. Based on receiving the SIP 200 OK message, AS 120 may transmit another SIP INVITE message to MRF 125. The SIP INVITE message may include information identifying the codec associated with UE 105-1 and the information identifying the codec associated with associated with UE 105-4.

As shown in FIG. 1D, AS 120 may receive a SIP Trying message from MRF 125. The SIP Trying message may indicate, to AS 120, that MRF 125 is processing the request to allocate MRF 125 to perform the transcoding operations (e.g., using CodecA and CodecB) during the call. After receiving the SIP Trying message, AS 120 may receive a SIP 200 OK message, from MRF 125, indicating that MRF 125 has been allocated to perform the transcoding operations during the call. The SIP 200 OK message may include information identifying the codecs that MRF 125 will be using during the call (e.g., CodecT1 and CodecT2).

Based on receiving the SIP 200 OK message from MRF 125, AS 120 may transmit a SIP 200 OK message, to UE 105-1, indicating the codec associated with UE 105-1 will be used to transcode data transmitted by UE 105-1 during the call. Based on receiving the SIP 200 OK message from MRF 125, AS 120 may transmit a SIP ACK message, to MRF 125, indicating that AS 120 has received the SIP 200 OK message from MRF 125.

As shown in FIG. 1E, based on transmitting the SIP ACK message to MRF 125, AS 120 may cause MRF 125 to establish the call between UE 105-1 and UE 105-4. For example, MRF 125 may establish a two-way audio call between UE 105-1 and UE 105-4. AS 120 may receive a SIP ACK message, from UE 105-1, indicating that the call has been established between UE 105-1 and UE 105-4. Based on receiving the SIP ACK message from UE 105-1, AS 120 may transmit a SIP ACK message, to MRF 125, indicating that UE 105-1 has confirmed that the call has been established between UE 105-1 and UE 105-4.

As shown in FIG. 1E, AS 120 may transmit a SIP CANCEL message to UE 105-2 to cancel the request for the transcoding information and a SIP CANCEL message to UE 105-3 to cancel the request for the transcoding information. In some implementations, AS 120 may transmit the SIP cancel messages based on receiving the transcoding information from UE 105-4. AS 120 may receive, from UE 105-2, a SIP 200 OK message indicating that UE 105-2 has receive the SIP CANCEL message and has canceled the request based on the SIP CANCEL message. AS 120 may transmit a SIP ACK message to UE 105-2 based on receiving the SIP 200 OK message from UE 105-2. AS 120 and UE 105-3 may engage in a similar exchange of SIP messages.

As shown in FIG. 1E, the call may last for a period of time illustrated by call hold time. As shown in FIG. 1E, after establishing the call, AS 120 may receive a SIP BYE message from UE 105-1. The SIP BYE message may include an indication of termination of the call, AS 120 may transmit the indication of the termination of the call to UE 105-4 to end the call between UE 105-1 and 105-4. Based on receiving the SIP BYE message, AS 120 may transmit a SIP BYE message, to UE 105-4, including the indication of termination of the call.

AS 120 may receive, from UE 105-4, a SIP 200 OK message indicating that UE 105-4 has received the SIP BYE message and that UE 105-4 is ready for the call to be terminated. AS 120 may transmit a SIP ACK message to UE 105-4 based on receiving the SIP 200 OK message from UE 105-4. AS 120 may transmit, to UE 105-1, a SIP 200 OK message indicating that AS 120 has received the SIP BYE message and that UE 105-4 is ready for the call to be terminated. AS 120 may receive, from UE 105-1, a SIP ACK message based on transmitting the SIP 200 OK message to UE 105-1. The call may be terminated based on AS 120 receiving the SIP ACK message from UE 105-1.

The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
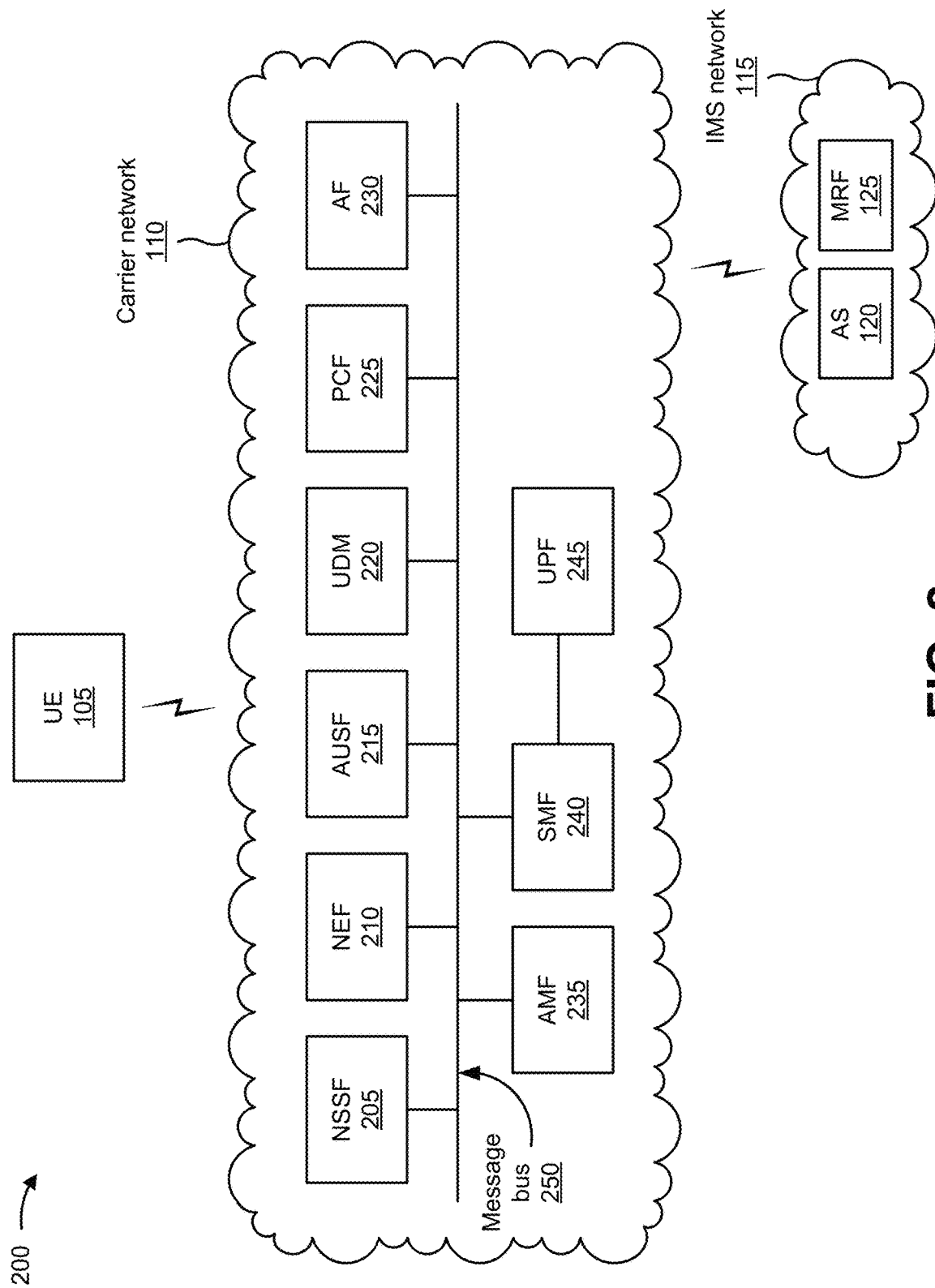
FIG. 2 is a diagram of an example functional architecture of an environment described herein.

FIG. 2 is a diagram of an example functional architecture of an environment 200 described herein. For example, FIG. 2 may show an example functional architecture of a 5G NG core network included in a 5G wireless telecommunications system. The example functional architecture of environment 200 is merely provided as an example functional architecture of an example network that may be used in conjunction with the present disclosure. In practice, there may be an additional network and/or a different network than the 5G NG core network shown in FIG. 2.

Figure 3:
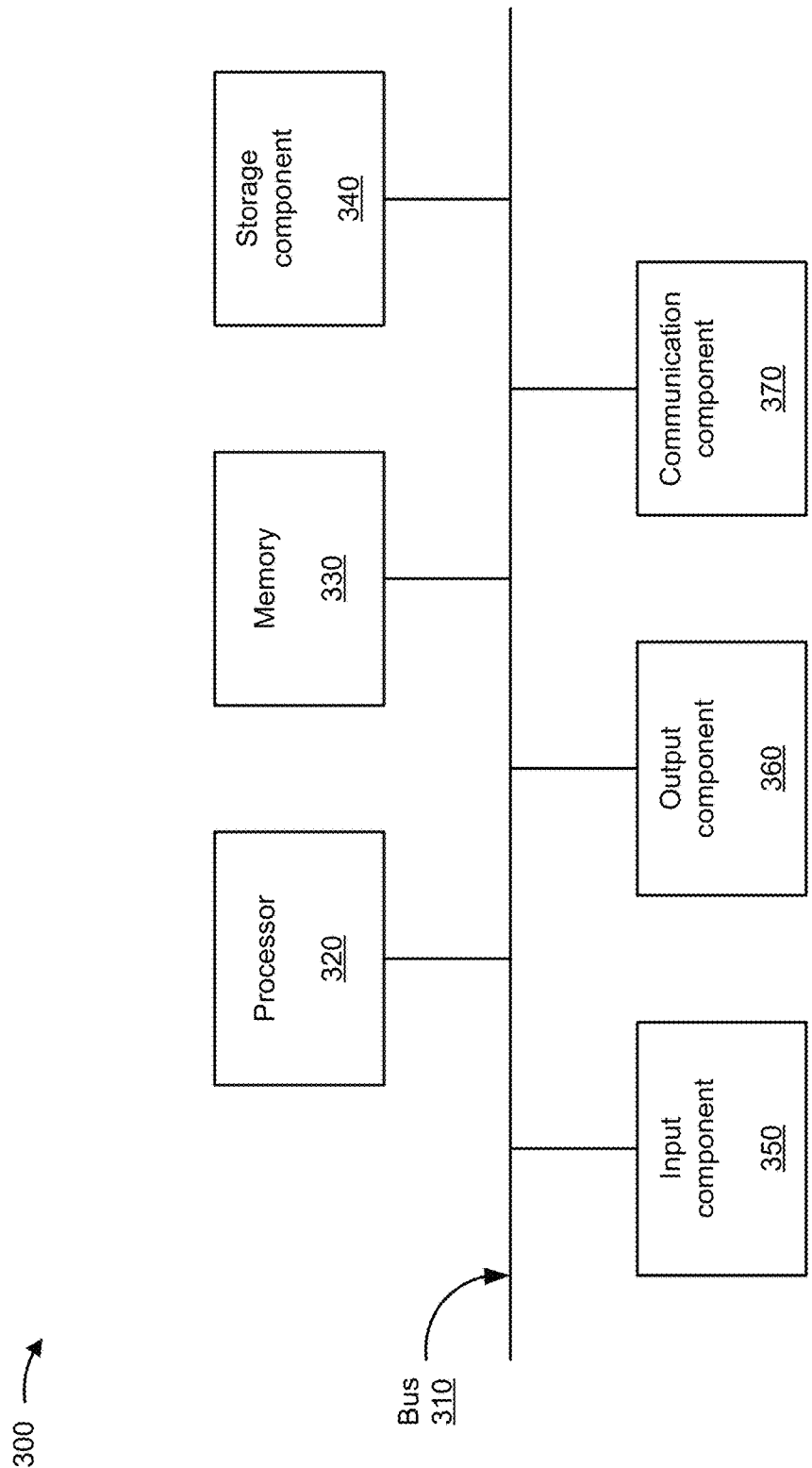
FIG. 3 is a diagram of example components of one or more devices of FIG. 1 and/or FIG. 2.

In some implementations, the example functional architecture may be implemented by a carrier network (e.g., carrier network 110 of FIG. 1) and/or one or more devices (e.g., a device described with respect to FIG. 3). While the example functional architecture of environment 200 shown in FIG. 2 may be an example of a service-based architecture, in some implementations, environment 200 may be implemented as a reference-point architecture.

As shown in FIG. 2, environment 200 may include a plurality of functional elements. Environment 200 may include carrier network 110. The functional elements may include, for example, a network slice selection function (NSSF) 205, a network exposure function (NEF) 210, an authentication server function (AUSF) 215, a UDM 220, a policy control function (PCF) 225, an application function (AF) 230, an access and mobility function (AMF) 235, a session management function (SMF) 240, a user plane function (UPF) 245. These functional elements may be communicatively connected via a message bus 250, which may be comprised of one or more physical communication channels and/or one or more virtual communication channels. Each of the functional elements shown in FIG. 2 is implemented on one or more devices associated with a wireless telecommunications system, such as a device described with respect to FIG. 3.

In some implementations, one or more of the functional elements may be implemented on one or more physical devices (which may be referred to herein as "platform devices"), such as an access point, a base station, a gateway, a server, and/or the like. In some implementations, one or more of the functional elements may be implemented on one or more computing devices of a cloud computing environment associated with the wireless telecommunications system. In some implementations, environment 200 may be operatively connected to IMS network 115 via wired and/or wireless connections with UPF 245.

NSSF 205 may select network slice instances for UEs. By providing network slicing, NSSF 205 allows an operator to deploy multiple substantially independent end-to-end networks potentially with the same infrastructure. In some implementations, each slice may be customized for different services. NEF 210 may support the exposure of capabilities and/or events in the wireless telecommunications system to help other entities in the wireless telecommunications system discover network services and/or utilize network resources efficiently.

AUSF 215 may act as an authentication server and support the process of authenticating UEs in the wireless telecommunications system. UDM 220 may store subscriber data and profiles in the wireless telecommunications system. UDM 220 may be used for fixed access, mobile access, and/or the like, in environment 200. PCF 225 may provide a policy and charging framework that incorporates network slicing, roaming, packet processing, mobility management, and/or the like.

AF 230 may determine whether UEs provide preferences for a set of network slice policies and support application influence on traffic routing, access to NEF 210, policy control, and/or the like. AMF 235 may provide authentication and authorization of UEs. SMF 240 may support the establishment, modification, and release of communications sessions in the wireless telecommunications system. For example, SMF 240 may configure traffic steering policies at UPF 245, enforce UE IP address allocation and policies, and/or the like. AMF 235 and SMF 240 may act as a termination point for Non-Access Stratum (NAS) signaling, mobility management, and/or the like. SMF 240 may act as a termination point for session management related to NAS.

UPF 245 may serve as an anchor point for intra/inter Radio Access Technology (RAT) mobility. UPF 245 may apply rules to packets, such as rules pertaining to packet routing, traffic reporting, handling user plane QoS, and/or the like. UPF 245 may determine an attribute of application-specific data that is communicated in a communications session. Message bus 250 represents a communication structure for communication among the functional elements. In other words, message bus 250 may permit communication between two or more functional elements. Message bus 250 may be a communication bus, HTTP/2 proxy server, and/or the like.

As shown in FIG. 3, UE 105 (which has been described in connection with FIGS. 1A-1E) may be connected to carrier network 110. IMS network 115 may include various types of data networks, such as the Internet, a third-party services network, an operator services network, a private network, a wide area network, and/or the like. As shown in FIG. 2, IMS network may include AS 120 and MRF 125, which have been described in connection with FIGS. 1A-1E.

The number and arrangement of functional elements shown in FIG. 2 are provided as an example. In practice, there may be additional functional elements, fewer functional elements, different functional elements, or differently arranged functional elements than those shown in FIG. 2. Furthermore, two or more functional elements shown in FIG. 2 may be implemented within a single device, or a single functional element shown in FIG. 2 may be implemented as multiple, distributed devices. Additionally, or alternatively, a set of functional elements (e.g., one or more functional elements) of environment 200 may perform one or more functions described as being performed by another set of functional elements of environment 200.

FIG. 3 is a diagram of example components of a device 300 of FIG. 1 and/of FIG. 2, which may correspond to UE 105, AS 120, and/or MRF 125. In some implementations, UE 105, AS 120, and/or MRF 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
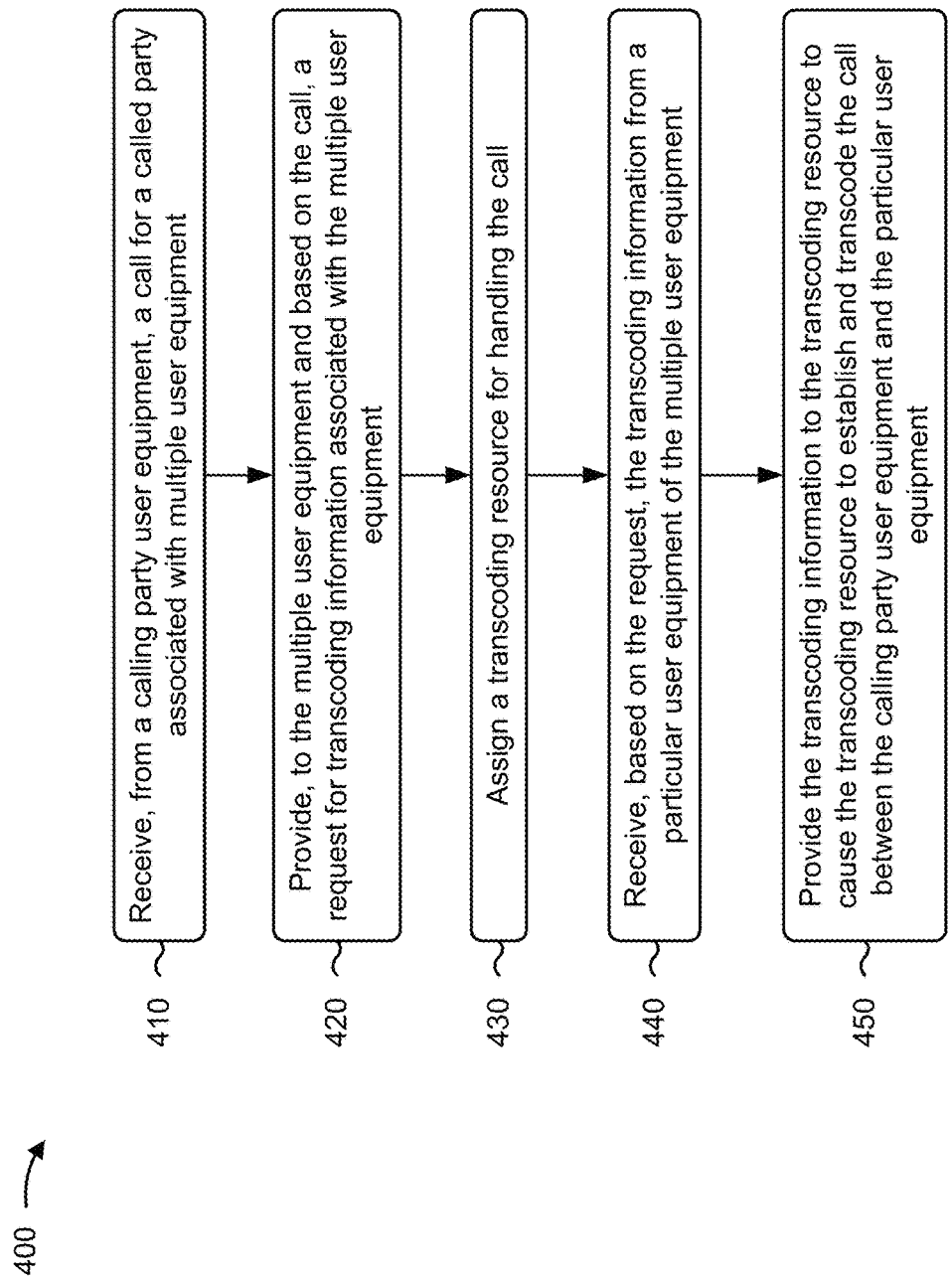
FIG. 4 is a flowchart of an example process relating to reducing transcoding resource allocation during call setup to multiple terminations.

FIG. 4 is a flowchart of an example process 400 relating to reducing transcoding resource allocation during call setup to multiple terminations. In some implementations, one or more process blocks of FIG. 4 may be performed by an application server (e.g., application server 120). In some implementations, one or more process blocks of FIG. 4 may be performed by another device or a group of devices separate from or including the application server, such as UE (e.g., UE 105), and/or MRF (e.g., MRF 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a calling party user equipment, a call for a called party associated with multiple user equipment (block 410). For example, the application server may receive, from a calling party user equipment, a call for a called party associated with multiple user equipment, as described above. In some implementations, the application server may receive the call for the called party from a carrier network. In some implementations, the call may be a service call and the multiple user equipment may be associated with corresponding call assistants for handling service calls. The call may include a codec associated with the calling party user equipment.

As further shown in FIG. 4, process 400 may include providing to the multiple user equipment, and based on the call, a request for transcoding information associated with the multiple user equipment (block 420). For example, the application server may provide to the multiple user equipment, and based on the call, a request for transcoding information associated with the multiple user equipment, as described above.

As further shown in FIG. 4, process 400 may include assigning a transcoding resource for handling the call, wherein the transcoding resource is provided in the Internet protocol multimedia subsystem network (block 430). For example, the application server may assign a transcoding resource for handling the call, wherein the transcoding resource is provided in the Internet protocol multimedia subsystem network, as described above.

In some implementations, the transcoding resource is provided in the Internet protocol multimedia subsystem network. The transcoding resource includes a media resource function of the Internet protocol multimedia subsystem network. In some implementations, the application server may prevent application servers associated with the multiple user equipment from assigning additional transcoding resources for handling the call.

As further shown in FIG. 4, process 400 may include receiving, based on the request, the transcoding information from a particular user equipment of the multiple user equipment (block 440). For example, the application server may receive, based on the request, the transcoding information from a particular user equipment of the multiple user equipment, as described above.

As further shown in FIG. 4, process 400 may include providing the transcoding information to the transcoding resource, wherein the transcoding information causes the transcoding resource to establish and transcode the call between the calling party user equipment and the particular user equipment (block 450). For example, the application server may provide the transcoding information to the transcoding resource, wherein the transcoding information causes the transcoding resource to establish and transcode the call between the calling party user equipment and the particular user equipment, as described above.

In some implementations, the transcoding information causes the transcoding resource to establish and transcode the call between the calling party user equipment and the particular user equipment and to provide audio for the call between the calling party user equipment and the particular user equipment, via a real time control protocol. The transcoding resource may include a media resource function of the Internet protocol multimedia subsystem network.

Process 400 may include additional implementations, such as any single implementation or any combination of implementations described below and/or in connection with one or more other processes described elsewhere herein.

In a first implementation, process 400 includes canceling the request for the transcoding information from the multiple user equipment, other than the particular user equipment, based on receiving the transcoding information from the particular user equipment.

In a second implementation, the transcoding information includes a codec associated with the particular user equipment. Process 400 may include receiving, from the calling party user equipment, the additional transcoding information with the call for the called party; and providing the additional transcoding information to the transcoding resource. The additional transcoding information may include a codec associated with the calling party user equipment.

In a third implementation, process 400 includes receiving, from the calling party user equipment and after providing the transcoding information to the transcoding resource, an indication of termination of the call, and providing the indication of the termination of the call to the particular user equipment to end the call between the calling party user equipment and the particular user equipment.

In a fourth implementation, the transcoding information causes the transcoding resource to establish the call between the calling party user equipment and the particular user equipment, via a session initiation protocol.

In a fifth implementation, the transcoding information causes the transcoding resource to provide audio for the call between the calling party user equipment and the particular user equipment, via a real time control protocol.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
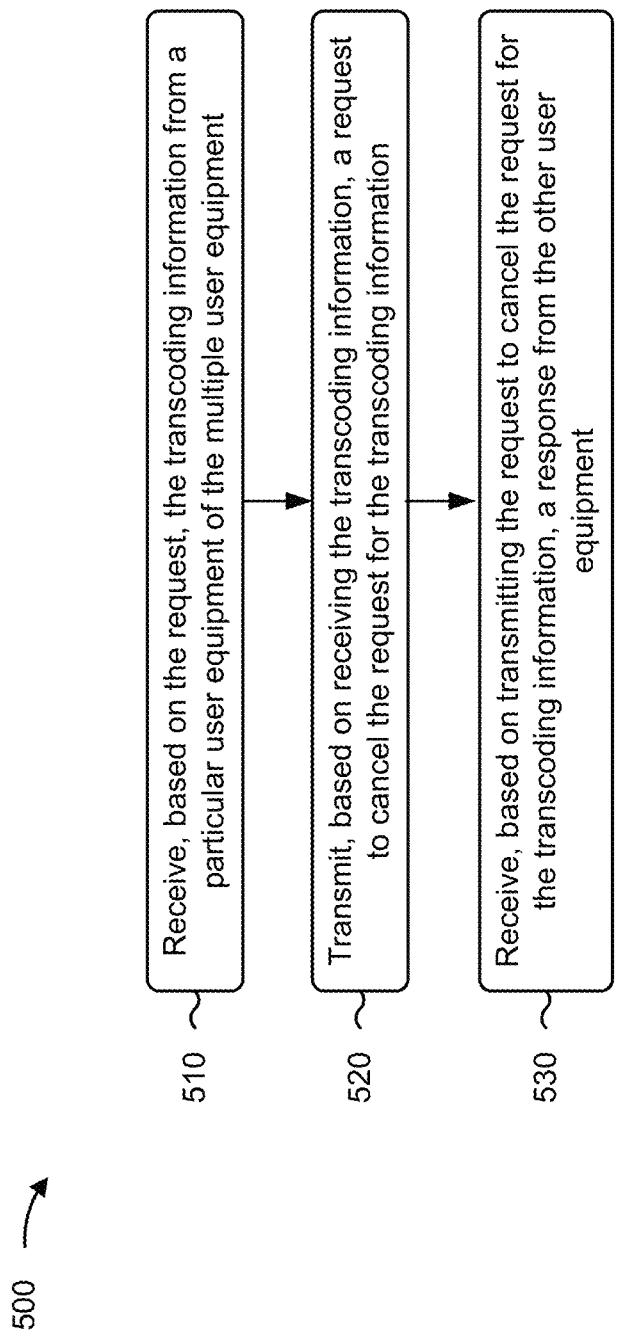
FIG. 5 is a flowchart of an example process relating to reducing transcoding resource allocation during call setup to multiple terminations.

FIG. 5 is a flowchart of an example process 500 relating to reducing transcoding resource allocation during call setup to multiple terminations. In some implementations, one or more process blocks of FIG. 5 may be performed by an application server (e.g., application server 120). In some implementations, one or more process blocks of FIG. 5 may be performed by another device or a group of devices separate from or including the application server, such as UE (e.g., UE 105), and/or MRF (e.g., MRF 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 5, process 500 may include receiving, based on a request for transcoding information associated with the multiple user equipment, the transcoding information from a particular user equipment of the multiple user equipment (block 510). For example, the application server may receive, based on a request for transcoding information associated with the multiple user equipment, the transcoding information from a particular user equipment of the multiple user equipment, as described above.

As further shown in FIG. 5, process 500 may include transmitting, based on receiving the transcoding information from the particular user equipment and to other user equipment of the multiple user equipment, a request to cancel the request for the transcoding information (block 520). For example, the application server may transmit, based on receiving the transcoding information from the particular user equipment and to other user equipment of the multiple user equipment, a request to cancel the request for the transcoding information, as described above.

As further shown in FIG. 5, process 500 may include receiving, based on transmitting the request to cancel the request for the transcoding information and from the other user equipment, a response indicating that the other user equipment have canceled the request for the transcoding information (block 530). For example, the application server may receive, based on transmitting the request to cancel the request for the transcoding information and from the other user equipment, a response indicating that the other user equipment have canceled the request for the transcoding information, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by an application server of a network and from a calling party user equipment, a call for a called party associated with multiple user equipments;
   providing, by the application server, to the multiple user equipments, and based on the call, a request for transcoding information associated with the multiple user equipments;
   assigning, by the application server, a transcoding resource for handling the call,
      wherein the transcoding resource is provided in the network;
   receiving, by the application server and based on the request, the transcoding information from a particular user equipment of the multiple user equipments; and
   providing, by the application server, the transcoding information to the transcoding resource,
      wherein the transcoding information causes the transcoding resource to establish and transcode the call between the calling party user equipment and the particular user equipment, and
   transmitting, by the application server, a message to cancel the request for the transcoding information to the multiple user equipments, other than the particular user equipment, based on receiving the transcoding information from the particular user equipment.

2. The method of claim 1, wherein the network is an Internet protocol multimedia subsystem network, and
   wherein the transcoding resource includes a media resource function of the Internet protocol multimedia subsystem network.

3. The method of claim 1, wherein the transcoding information includes a codec associated with the particular user equipment.

4. The method of claim 1, further comprising:
   receiving, from the calling party user equipment and after providing the transcoding information to the transcoding resource, an indication of termination of the call; and
   providing the indication of the termination of the call to the particular user equipment to end the call between the calling party user equipment and the particular user equipment.

5. The method of claim 1, wherein the transcoding information causes the transcoding resource to establish the call between the calling party user equipment and the particular user equipment, via a session initiation protocol.

6. The method of claim 1, wherein the transcoding information causes the transcoding resource to provide audio for the call between the calling party user equipment and the particular user equipment, via a real time control protocol.

7. The method of claim 1, wherein the application server is associated with the calling party user equipment, and wherein the method further comprises:
   preventing application servers associated with the multiple user equipments from assigning additional transcoding resources for handling the call.

8. An application server of a network, the application server comprising:
   one or more processors configured to:
      receive, from a calling party user equipment, a call for a called party associated with multiple user equipments;
      provide to the multiple user equipments, and based on the call, a request for transcoding information associated with the multiple user equipments;
      assign a transcoding resource for handling the call,
         wherein the transcoding resource is provided in the network;
      receive, based on the request, the transcoding information from a particular user equipment of the multiple user equipments;
      provide the transcoding information to the transcoding resource,
         wherein the transcoding information causes the transcoding resource to establish and transcode the call between the calling party user equipment and the particular user equipment; and
      transmit a message to cancel the request for the transcoding information from the multiple user equipments, other than the particular user equipment, based on receiving the transcoding information from the particular user equipment.

9. The application server of claim 8, wherein the one or more processors, when receiving the call for the called party associated with the multiple user equipments, are configured to: receive the call for the called party from a carrier network.

10. The application server of claim 8, wherein the calling party user equipment is associated with additional transcoding information, and the one or more processors are further configured to:
    receive, from the calling party user equipment, the additional transcoding information with the call for the called party; and
    provide the additional transcoding information to the transcoding resource.

11. The application server of claim 10, wherein the additional transcoding information includes a codec associated with the calling party user equipment.

12. The application server of claim 8, wherein the call is a service call and the multiple user equipments are associated with corresponding call assistants for handling service calls.

13. The application server of claim 8, wherein the application server is associated with the calling party user equipment, and the one or more processors are further configured to:
prevent application servers associated with the multiple user equipments from assigning additional transcoding resources for handling the call.

14. The application server of claim 8, wherein the call includes a codec associated with the calling party user equipment.

15. A non-transitory computer-readable medium storing a set of instructions, the set of instructions comprising:
one or more instructions that, when executed by one or more processors of an application server of a network, cause the application server to:
receive, from a calling party user equipment, a call for a called party associated with multiple user equipments;
provide to the multiple user equipments, and based on the call, a request for transcoding information associated with the multiple user equipments;
assign a transcoding resource for handling the call, wherein the transcoding resource is provided in the network; receive, based on the request, the transcoding information from a particular user equipment of the multiple user equipments;
provide the transcoding information to the transcoding resource,
wherein the transcoding information causes the transcoding resource to establish and transcode the call between the calling party user equipment and the particular user equipment;
receive, from the calling party user equipment and after providing the transcoding information to the transcoding resource, an indication of termination of the call; and
provide the indication of the termination of the call to the particular user equipment to end the call between the calling party user equipment and the particular user equipment; and
transmit a message to cancel the request for the transcoding information to the multiple user equipments, other than the particular user equipment, based on receiving the transcoding information from the particular user equipment.

16. The non-transitory computer-readable medium of claim 15, wherein the network is an Internet protocol multimedia subsystem network, and
wherein the transcoding resource includes a media resource function of the Internet protocol multimedia subsystem network.

17. The non-transitory computer-readable medium of claim 15, wherein the transcoding information causes the transcoding resource to:
establish the call between the calling party user equipment and the particular user equipment, via a session initiation protocol; and
provide audio for the call between the calling party user equipment and the particular user equipment, via a real time control protocol.

18. The non-transitory computer-readable medium of claim 15, wherein the calling party user equipment is associated with additional transcoding information, and the one or more instructions further cause the application server to:
receive, from the calling party user equipment, the additional transcoding information with the call for the called party; and
provide the additional transcoding information to the transcoding resource.

19. The non-transitory computer-readable medium of claim 15, wherein the application server is associated with the calling party user equipment, and the one or more instructions further cause the application server to:
prevent application servers associated with the multiple user equipments from assigning additional transcoding resources for handling the call.

20. The non-transitory computer-readable medium of claim 15, wherein the transcoding information includes a codec associated with the particular user equipment.

* * * * *